(12) United States Patent
Sippel et al.

(10) Patent No.: US 10,655,479 B2
(45) Date of Patent: May 19, 2020

(54) TURBINE WHEEL ASSEMBLY WITH CERAMIC MATRIX COMPOSITE BLADES

(71) Applicants: Rolls-Royce Corporation, Indianapolis, IN (US); Rolls-Royce North American Technologies Inc., Indianapolis, IN (US)

(72) Inventors: Aaron D. Sippel, Zionsville, IN (US); Ted J. Freeman, Danville, IN (US)

(73) Assignees: Rolls-Royce Corporation, Indianapolis, IN (US); Rolls-Royce North American Technologies Inc., Indianapolis, IN (US)

( * ) Notice: Subject to any disclaimer, the term of this patent is extended or adjusted under 35 U.S.C. 154(b) by 40 days.

(21) Appl. No.: 16/032,848

(22) Filed: Jul. 11, 2018

(65) Prior Publication Data

US 2020/0018177 A1    Jan. 16, 2020

(51) Int. Cl.
    *F01D 5/30* (2006.01)
    *F01D 5/28* (2006.01)

(52) U.S. Cl.
    CPC ............ *F01D 5/3007* (2013.01); *F01D 5/282* (2013.01); *F05D 2220/323* (2013.01); *F05D 2230/60* (2013.01); *F05D 2240/30* (2013.01); *F05D 2300/6033* (2013.01)

(58) Field of Classification Search
    CPC ...... F01D 5/3007; F01D 5/282; F01D 5/3023; F01D 5/3053; F01D 5/3084; F01D 5/3092; F05D 2220/323; F05D 2230/60; F05D 2240/30; F05D 2300/6033
    See application file for complete search history.

(56) References Cited

U.S. PATENT DOCUMENTS

| | | | |
|---|---|---|---|
| 3,702,222 A | 11/1972 | Bernales | |
| 4,084,922 A | 4/1978 | Glenn | |
| 4,093,399 A * | 6/1978 | Glenn | ............... F01D 5/087 416/193 A |
| 4,142,836 A | 3/1979 | Glenn | |
| 8,920,127 B2 | 12/2014 | McCaffrey | |
| 2007/0189901 A1* | 8/2007 | Dundas | ............... F01D 5/3007 416/223 A |
| 2015/0140431 A1 | 4/2015 | Kim et al. | |
| 2016/0040539 A1* | 2/2016 | McCaffrey | ............. F01D 5/147 60/805 |
| 2016/0186594 A1* | 6/2016 | Healy | ............. F04D 29/322 416/198 A |
| 2016/0201484 A1* | 7/2016 | Engel | ............... F01D 5/326 416/220 R |

* cited by examiner

*Primary Examiner* — Dwayne J White
*Assistant Examiner* — Eric A Lange
(74) *Attorney, Agent, or Firm* — Barnes & Thornburg LLP

(57) ABSTRACT

A wheel assembly for a gas turbine engine includes a disk, a blade-attachment system, and a plurality of blades. The disk is configured to rotate about an axis during operation of the gas turbine engine. The blade-attachment system is configured to couple the plurality of blades with the disk for rotation therewith.

19 Claims, 6 Drawing Sheets

TURBINE WHEEL ASSEMBLY WITH CERAMIC MATRIX COMPOSITE BLADES

FIELD OF THE DISCLOSURE

The present disclosure relates generally to gas turbine engines, and more specifically to airfoil assemblies for use in gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

To withstand heat from the combustion products received from the combustor, the turbine may include turbine wheels having blades that comprise composite materials adapted to interact with the hot combustion products. In some turbine wheels, the blades may be coupled to a disk that supports the blades in a gas path of the engine. Coupling the composite blades with disks, for example, metallic disks, can present design challenges.

SUMMARY

The present disclosure may comprise one or more of the following features and combinations thereof.

A wheel assembly for a gas turbine engine may include a metallic disk and a plurality of ceramic matrix composite blades. The metallic disk includes a body arranged around an axis and a plurality of disk posts that extend radially away from the body. The disk posts define an axially extending first disk slot and an axially extending second disk slot spaced apart circumferentially relative to the first disk slot. The plurality of ceramic matrix composite blades are adapted to interact with gases during use of the gas turbine engine and each of the plurality of ceramic matrix composite blades having substantially similar radial lengths.

In illustrative embodiments, the wheel assembly includes a blade-attachment system that couples the plurality of ceramic matrix composite blades to the disk for rotation with the disk. The blade-attachment system includes a first attachment member received in the first disk slot to couple the first attachment member to the disk and a second attachment member received in the second disk slot to couple the second attachment member to the disk.

In illustrative embodiments, the plurality of ceramic matrix composite blades includes a first blade, a second blade, and a third blade. Each of the first blade, the second blade, and the third blade includes a root and an airfoil that extends radially away from the root. The root of the first blade is received in the first attachment member to couple the first blade to the first attachment member. The root of the second blade is received in the second attachment member to couple the second blade to the second attachment member. The root of the third blade is received between the first attachment member and the second attachment member to couple the third blade to the blade-attachment system.

In illustrative embodiments, the first attachment member includes a first segment and a second segment that cooperate to define a blade-receiver cavity in which the first blade is received. The first attachment member includes a first bond layer located between the first segment and the second segment to couple the first segment to the second segment such that the first segment and the second segment apply a compression load to the first blade.

In illustrative embodiments, the first attachment member includes an isolation layer located between the root of the first blade and the first attachment member. The isolation layer resists chemical interaction between the first attachment member and the first blade. In illustrative embodiments, the root of the third blade is not bonded to the first attachment member and the second attachment member.

In illustrative embodiments, the root of the first blade has a first planar side and a second planar side spaced apart circumferentially from the first planar side. The first planar side and the second planar side define an angle alpha therebetween. The angle alpha is between about 10 degrees and about 60 degrees.

In illustrative embodiments, the first attachment member includes a forward wall and an aft wall spaced apart axially from the forward wall. The forward wall and the aft wall define a portion of a blade-receiver cavity formed in the first attachment member. The first blade is received in the blade-receiver cavity. The forward wall and the aft wall block the first blade from moving axially out of the blade-receiver cavity. In some embodiments, the forward wall and the aft wall of the first attachment member extend circumferentially toward the second attachment member and block axial movement of the third blade relative to the first attachment member.

In illustrative embodiments, the first attachment member extends around the first blade and at least a portion of the third blade to form a portion of a primary gas path. Accordingly, the first attachment member is exposed to the gases and resists radially inward movement of the gases toward the disk during operation of the gas turbine engine.

According to another aspect of the present disclosure, a wheel assembly for a gas turbine engine may include a disk, a blade attachment system, and a plurality of blades. The disk may be formed to define a first disk slot and a second disk slot spaced apart circumferentially from the first disk slot. The blade-attachment system may include a first attachment member received in the first disk slot and a second attachment member received in the second disk slot. The plurality of blades may include a first blade received in the first attachment member, a second blade received in the second attachment member, and a third blade located between the first attachment member and the second attachment member. The first attachment member and the second attachment member may be shaped such that the first attachment member and the second attachment member block radial outward movement of the first blade, the second blade, and the third blade.

In illustrative embodiments, the first attachment member and the second attachment member form a portion of a primary gas path of the gas turbine engine such that the first attachment member and the second attachment member are exposed to gases and resist radially inward movement of the gases toward the disk during operation of the gas turbine engine.

In illustrative embodiments, the first attachment member includes a first segment and a second segment that cooperate to define a blade-receiver cavity in which the first blade is received. The first attachment member further includes a bond layer located between the first segment and the second segment. The first segment is formed to block the first blade from moving axially out of the blade-receiver cavity.

In illustrative embodiments, the first blade includes a root and an airfoil that extends radially away from the root. The root has a first planar side and a second planar side that cooperate to define an angle alpha between the first planar side and the second planar side. The angle alpha may be between about 10 degrees and about 60 degrees.

In illustrative embodiments, the first blade has a radial length equal to a radial length of the third blade. The first blade may be chemically isolated from metallic materials making up most of the first attachment member.

According to another aspect of the present disclosure, a method for making a turbine wheel assembly is disclosed. The method may include providing a blade and an attachment member. The blade includes a root and an airfoil that extends away from the root. The attachment member includes a first segment having a first lug and a first retainer arm that cooperate to define a first inner region and a second segment having a second lug and a second retainer arm that cooperate to define a second inner region.

In illustrative embodiments, the method may include locating the root of the blade in the first inner region and the second inner region. The method may further include compressing the root of the blade with the first segment and the second segment. The method may include coupling the first segment to the second segment to block relative movement between the first lug and the second lug after the compressing step so that the first lug and the second lug form an attachment root adapted to mate with a disk of a gas turbine engine.

In illustrative embodiments, the step of coupling may include bonding the first lug to the second lug to block relative movement between the first segment and the second segment. The root of the blade may have a first planar side and a second planar side that cooperate to define an angle alpha between the first planar side and the second planar side. The angle alpha may be between about 10 degrees and about 60 degrees.

These and other features of the present disclosure will become more apparent from the following description of the illustrative embodiments.

DETAILED DESCRIPTION OF THE DRAWINGS

Figure 1:
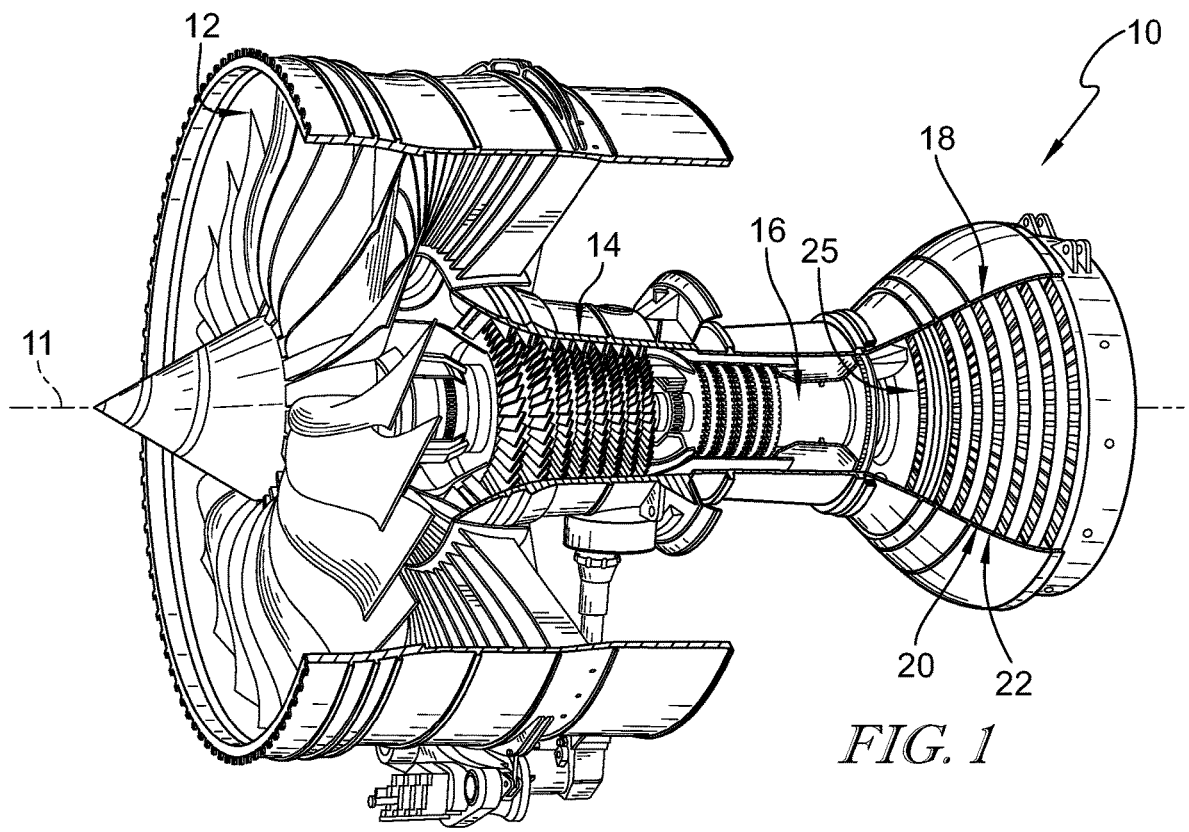
FIG. 1 is a cutaway view of a gas turbine engine that includes a fan, a compressor, a combustor, and a turbine and the turbine includes a plurality of turbine wheel assemblies in accordance with the present disclosure and adapted to extract work from hot combustion products received from the combustor.

For the purposes of promoting an understanding of the principles of the disclosure, reference will now be made to a number of illustrative embodiments illustrated in the drawings and specific language will be used to describe the same.

Figure 2:
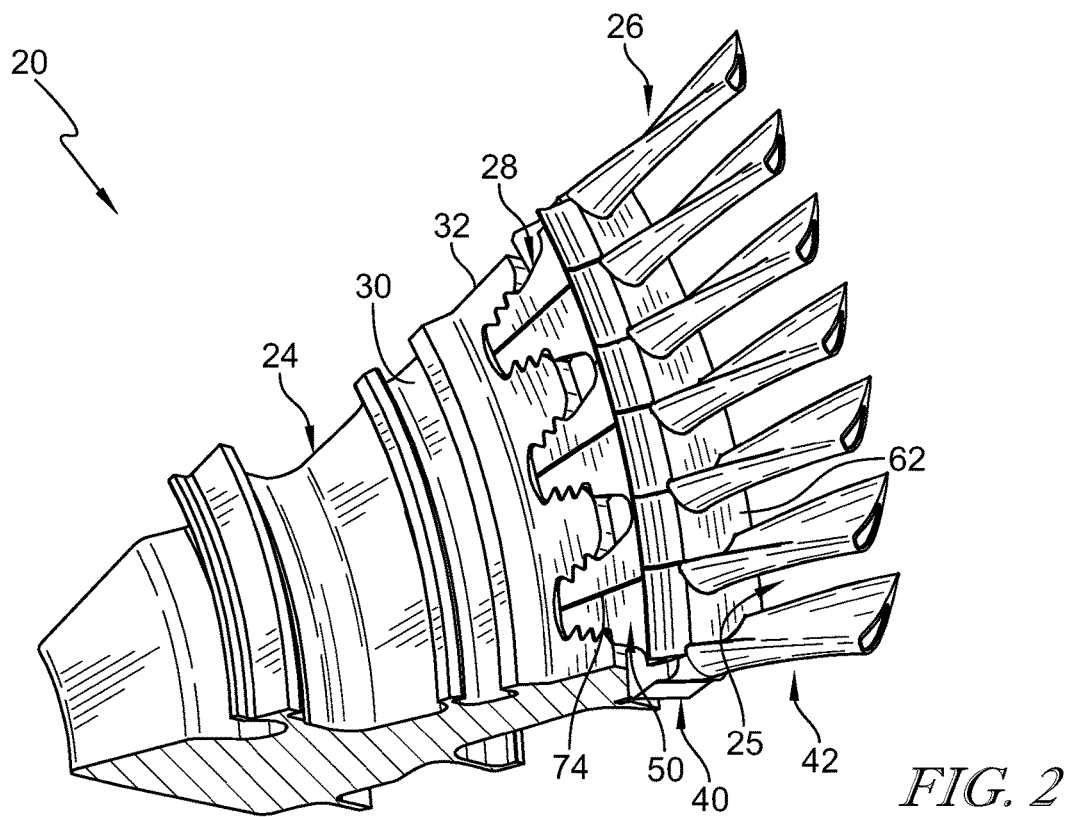
FIG. 2 is a perspective view of a portion of a turbine wheel assembly included in the gas turbine engine of FIG. 1 showing that the turbine wheel assembly includes a disk, a plurality of ceramic composite matrix blades, and a plurality of attachment members that are received by the disk and couple the plurality of blades to the disk.

A turbine wheel assembly 20 according to the present disclosure is adapted for use in a gas turbine engine 10 as suggested in FIGS. 1 and 2. The gas turbine engine 10 includes a fan 12, a compressor 14, a combustor 16, and a turbine 18. The fan 12 generates thrust for propelling an aircraft. The compressor 14 compresses and delivers air to the combustor 16. The combustor 16 mixes fuel with the compressed air received from the compressor 14 and ignites the fuel. The hot, high-pressure gases from the burning fuel are directed into the turbine 18 where the turbine 18 extracts work from the gases to drive the compressor 14 and the fan 12. In other embodiments, the gas turbine engine 10 may include a shaft, turboprop, or gearbox in place of the fan 12.

The turbine 18 includes a plurality of turbine wheel assemblies 20 and turbine vane assemblies 22 as shown in FIG. 1. A portion of a turbine wheel assembly 20 is shown in FIG. 2. Each turbine wheel assembly 20 is configured to interact with the hot combustion gases from the combustor 16 and rotate about the center axis 11 of the gas turbine engine 10 to generate power for driving the compressor 14 and the fan 12. The turbine vane assembly 22 is located between turbine wheel assemblies 20 to direct gases received from an upstream turbine wheel assembly 20 toward a downstream turbine wheel assembly 20.

Figure 3:
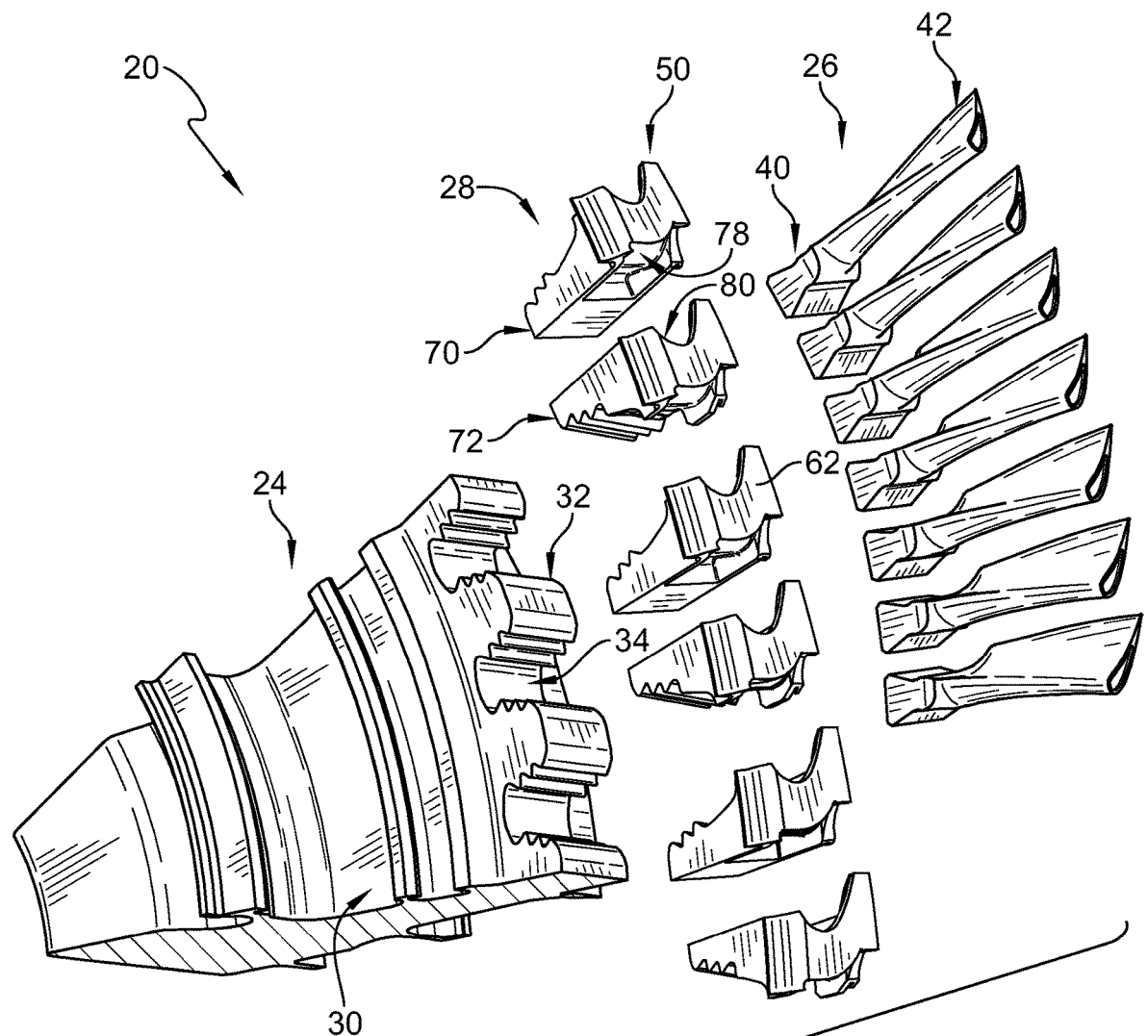
FIG. 3 is an exploded view of the turbine wheel assembly of FIG. 2 showing the disk, the plurality of attachment members, and the plurality of blades included in the turbine wheel assembly and showing that each attachment member includes a first and a second segments.

The turbine wheel assembly 20 includes a disk 24, a plurality of blades 26, and a blade-attachment system 28 as shown in FIGS. 2 and 3. The disk 24 is coupled to a shaft of the engine 10 and is configured to rotate the shaft about the center axis 11 during operation of the gas turbine engine 10 to generate power. The plurality of blades 26 are shaped to interact with and be rotated by the hot gases that move axially along a primary gas path 25 of the gas turbine engine 10. The blade-attachment system 28 couples the plurality of blades 26 to the disk 24 for rotation with the disk 24 about the center axis 11.

The disk 24 includes a body 30 arranged around the center axis 11 and a plurality of disk posts 32 as shown in FIG. 3. The disk posts 32 extend radially away from the body 30 to define an axially extending disk slot 34 between each adjacent pair of disk posts 32. The disk posts 32 and, thus, the disk slots 34 are spaced apart from one another circumferentially and each disk slot 34 is sized to receive a portion of the blade-attachment system 28. In other embodiments, the disk posts 32 may be shaped to define other shaped slots 34 such as, for example, dovetail-shaped slots. The disk 24 comprises metallic material in the illustrative embodiment.

Figure 5:
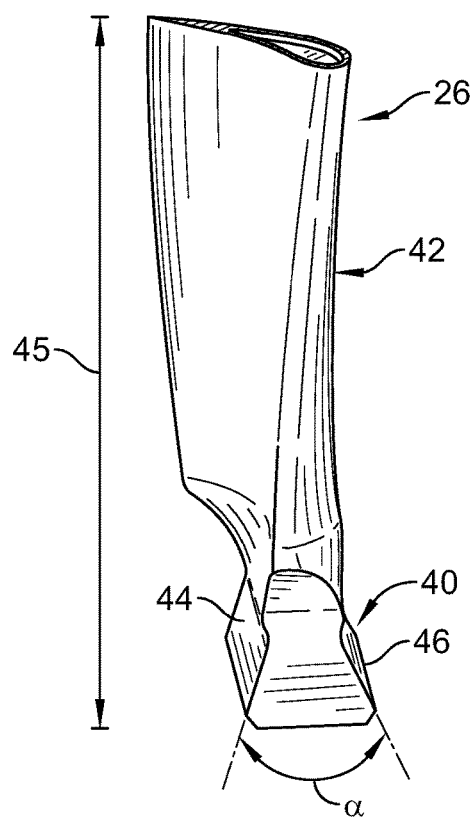
FIG. 5 is a perspective view of one of the plurality of blades included in the turbine wheel assembly showing that the blade includes a dovetail-shaped root and an airfoil that extends away from the root.

Each blade 26 includes a root 40 and an airfoil 42 that extends radially away from the root 40 relative to the center axis 11 as suggested in FIGS. 3 and 5. The root 40 of each blade 26 is received in the blade-attachment system 28 to couple the blades 26 to the disk 24 for rotation with the disk 24. The airfoils 42 are shaped to be pushed circumferentially by the hot gases moving in the primary gas path 25 to cause the turbine wheel assembly 20 to rotate about the center axis during operation of the gas turbine engine 10.

The root 40 of each blade 26 is dovetail shaped as shown in FIG. 5. The root 40 includes a first planar side 44 and a second planar side 46 spaced apart circumferentially from the first planar side 44. The first planar side 44 and the second planar side 46 extend axially. The first planar side 44 and the second planar side 46 define an angle alpha (α) therebetween. The angle alpha is between about (or specifically) 10 degrees and about (or specifically) 60 degrees in some embodiments.

Illustratively, the root 40 and airfoil 42 of each blade 26 are integrally formed such that each blade 26 is a one-piece integral component. The blades 26 comprise ceramic matrix composite materials in the illustrative embodiment. The blade 26 comprises only ceramic matrix composite materials in the illustrative embodiment. In other embodiments, the blades 26 may comprise one or more of ceramic matrix composite materials, composite materials, and metallic materials. Due to the materials of the blades 26, the blades 26 may weigh less than similar sized fully-metallic blades.

Figure 10:
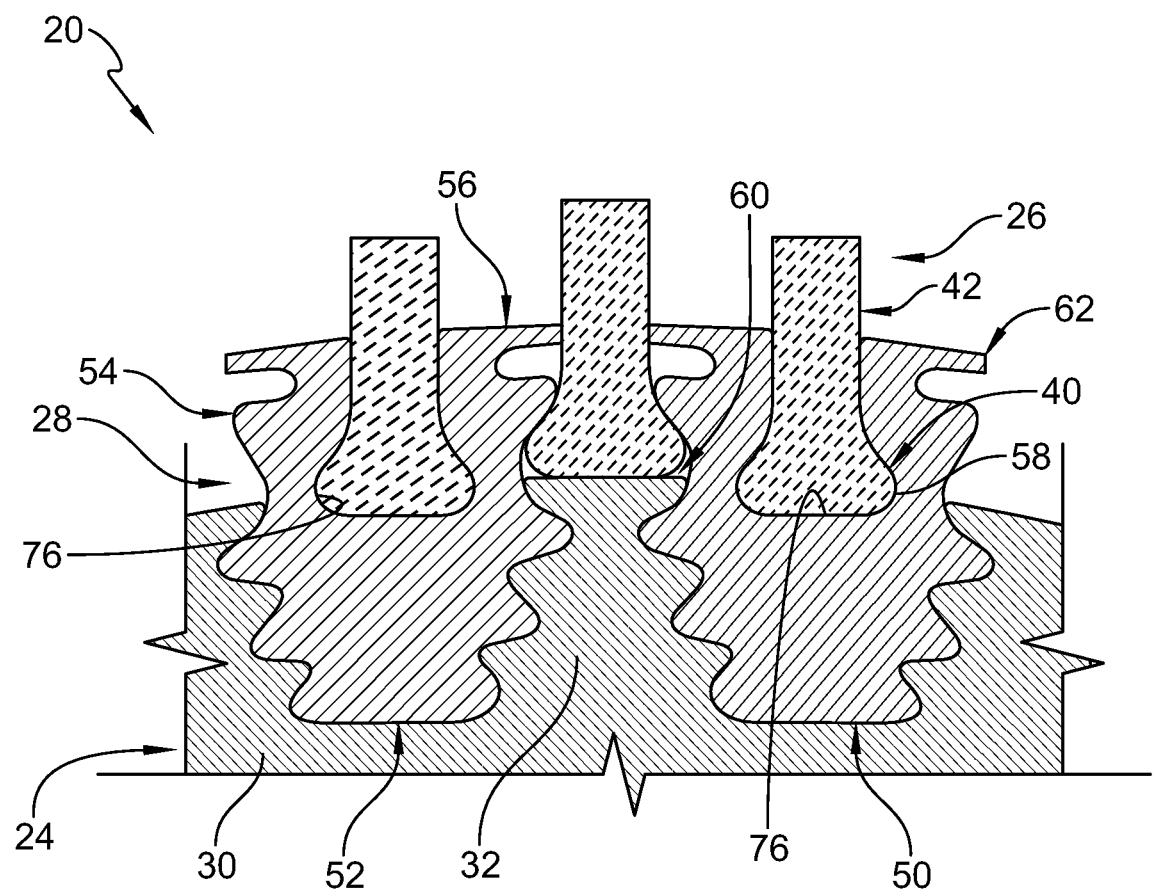
FIG. 10 is a section view of another embodiment of a turbine wheel assembly adapted for use in the gas turbine engine of FIG. 1.

Each blade 26 has a radial length 45 as measured from a bottom of the root 40 to a tip of the airfoil 42 as shown in FIG. 5. The blade-attachment system 28 of the embodiment shown in FIGS. 2-6 is designed such that all of the ceramic matrix composite blades 26 have substantially similar sizes including substantially similar radial lengths 45. Having blades 26 with substantially similar sizes and radial lengths 45 may reduce manufacturing and assembly costs. In other embodiments, the radial lengths of the blades 26 may vary as shown in FIG. 10.

Figure 4:
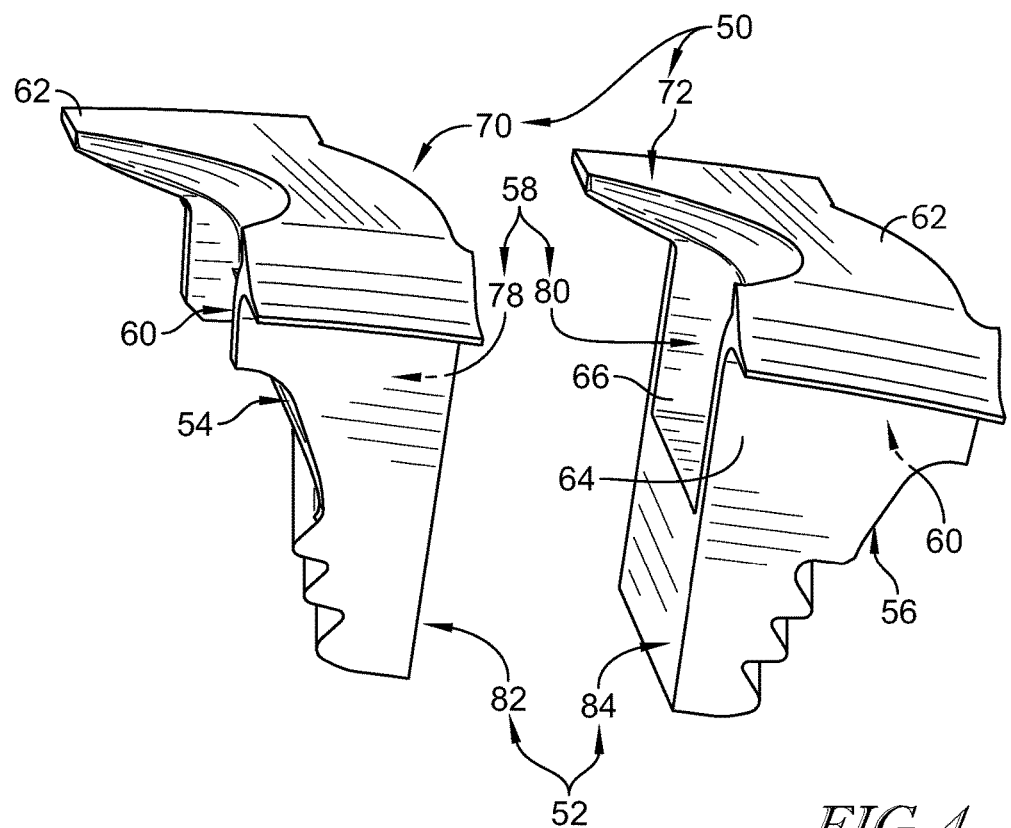
FIG. 4 is an exploded view of an attachment member included in the turbine wheel assembly showing that the first and second segments cooperate to define a blade-receiver cavity adapted to receive one of the plurality of blades.
Figure 6:
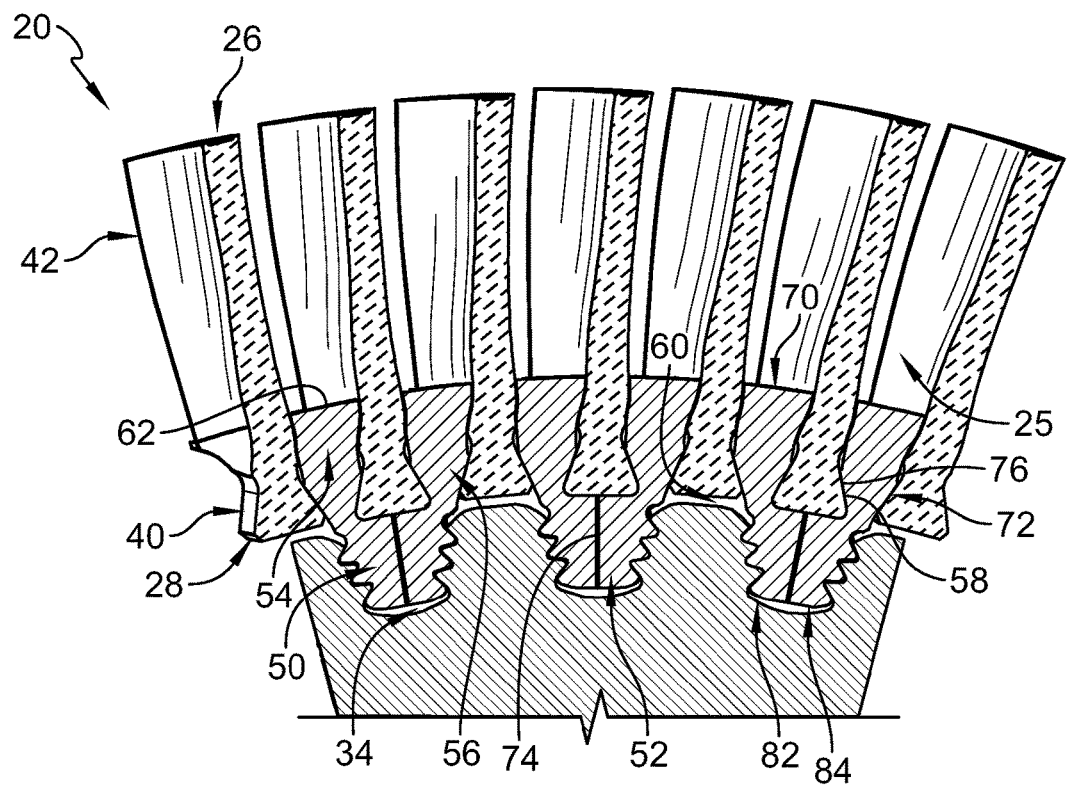
FIG. 6 is a section view of the turbine wheel assembly of FIG. 2 showing the plurality of blades retained in and between the plurality of attachment members.

The blade-attachment system 28 includes a plurality of attachment members 50 as shown in FIGS. 3, 4, and 6. Each attachment member 50 is formed to define a blade-receiver cavity 58 therein as shown in FIGS. 3 and 4. Adjacent attachment members 50 define blade-receiver passages 60 therebetween. The blades 26 are received in the blade-receiver cavities 58 and the blade-receiver passages 60 to couple the blades 26 to the blade-attachment system 28.

Each attachment member 50 includes an attachment root 52, a first retainer arm 54, and a second retainer arm 56 as shown in FIG. 6. The attachment root 52 is received in one of the disk slots 34 to couple the attachment member 50 to the disk 24. The first retainer arm 54 and the second retainer arm 56 extend radially away from the attachment root 52. The first retainer arm 54 and the second retainer arm 56 define the blade-receiver cavity 58 therebetween. The first retainer arm 54 of one attachment member 50 cooperates with the second retainer arm 56 of an adjacent attachment member 50 to define the blade-receiver passage 60.

The attachment members 50 of the illustrative embodiment further include platforms 62 that extend axially and circumferentially away from the retainer arms 54, 56 as shown in FIG. 4. The platforms 62 extend around the blades 26 to form a portion of the primary gas path 25 such that the attachment members 50 are exposed to the gases and resists radially inward movement of the gases toward the disk 24 during operation of the gas turbine engine 10. In other embodiments, the radial outermost surfaces of the attachment members 50 do not extend beyond the retainer arms 54, 56 and form a portion of the primary gas path 25. In other embodiments, the blades 26 include platforms or separate platform components are coupled around the blades 26 such that the attachment members 50 do not form a portion of the primary gas path 25.

The attachment members 50 include a forward wall 64 and an aft wall 66 spaced apart axially form the forward wall 64 as shown in FIGS. 2 and 4. The forward wall 64 and the aft wall 66 define a portion of a blade-receiver cavity 58 formed in the attachment member 50. The forward wall 64 and the aft wall 66 block the blade 26 received in the blade-receiver cavity 58 from moving axially out of the blade-receiver cavity 58. The forward wall 64 and the aft wall 66 of the attachment member 50 extend circumferentially toward adjacent attachment members and block axial movement of the blades 26 received in blade-receiver passages 60 formed on each side of the attachment member 50.

Figure 8:
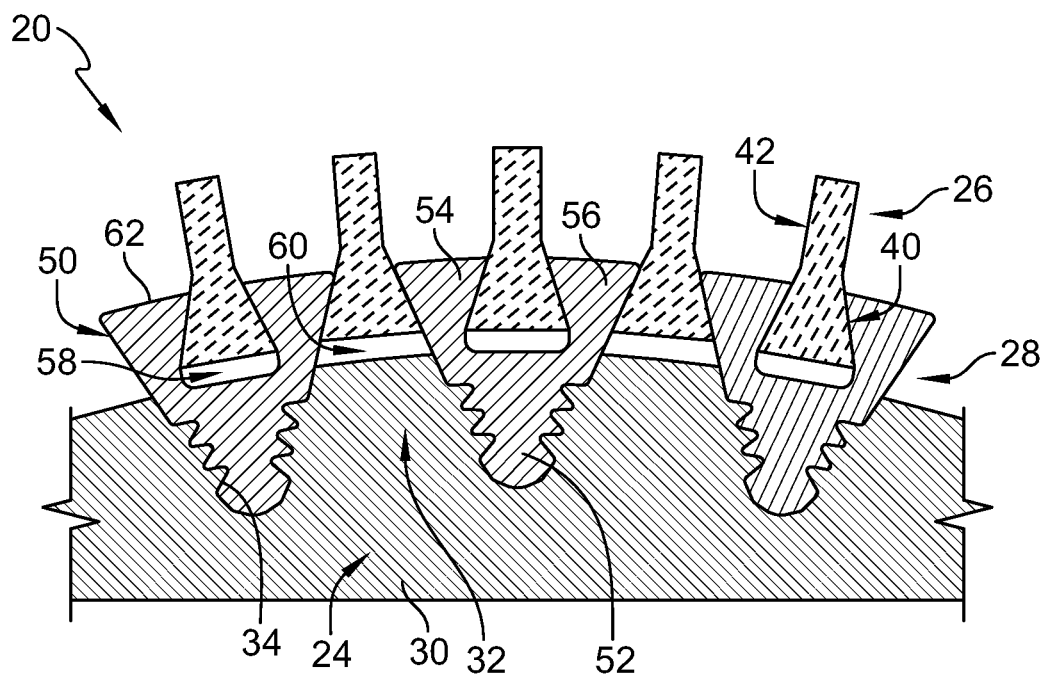
FIG. 8 is section view of another embodiment of a turbine wheel assembly adapted for use in the gas turbine engine of FIG. 1 showing that the attachment members include relatively wide ends.

In other embodiments, the forward wall 64 and the aft wall 66 may be omitted such that the blade-receiver cavity 58 extends axially through the attachment members 50 as suggested in FIG. 8. In such embodiments, the blades 26 may be inserted axially into the blade-receiver cavity 58 and/or the blade-receiver passage 60. Retainer rings or other means may be used to block axial movement of the blades 26 after being received in the cavities 58 and/or passages 60. In some embodiments, an isolation layer 76 is located between the root 40 of the blade 26 and the blade-receiver cavity 58 to chemically isolate the CMC blade 26 from the metallic attachment member 50 as shown in FIG. 6. The isolation layer 76 may resist chemical interaction of silica in the blade 26 with nickel or other elements in the attachment member 50. The isolation layer 76 may be made from aluminum oxide or other suitable materials. The blades 26 located in blade-receiver passages 60 between attachment members 50 may not be bonded to the attachment members 50.

Figure 9:
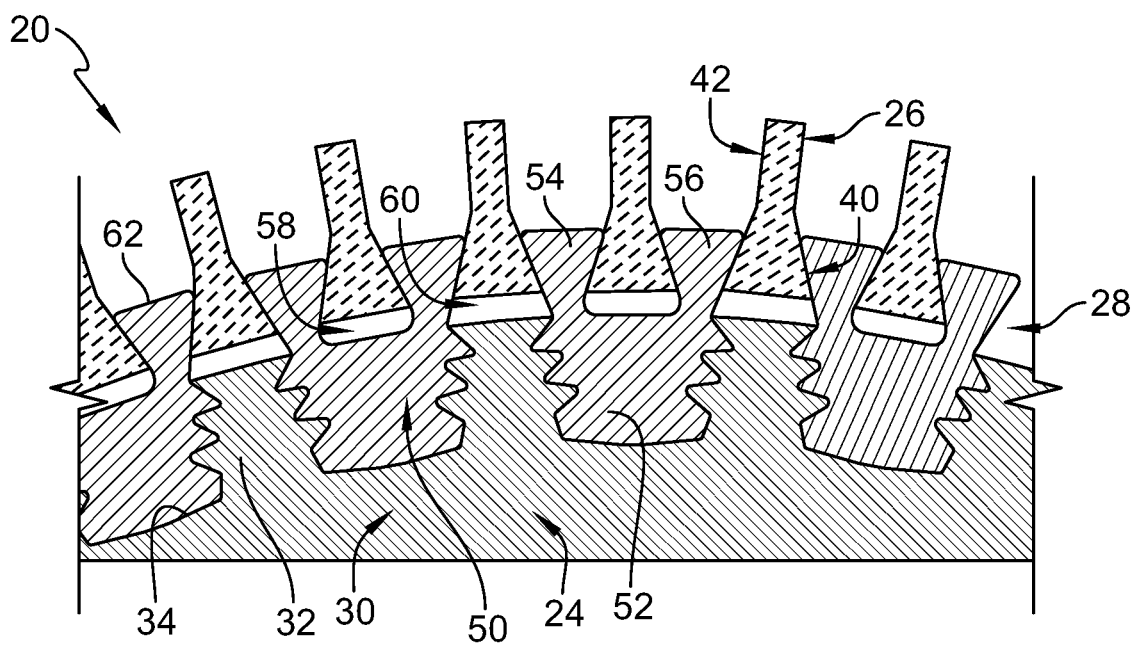
FIG. 9 is section view of another embodiment of a turbine wheel assembly adapted for use in the gas turbine engine of FIG. 1 showing that the attachment members include relatively narrow ends.

In the embodiments shown in FIGS. 2-7, each attachment member 50 is provided by a first segment 70 and a second segment 72 that meet at a radially extending interface. In the some embodiments, the attachment members 50 include a bond layer 74 located between the first segment 70 and the second segment 72 to bonded the segments 70, 72 together as shown in FIG. 6. In other embodiments, the first segment 70 and the second segment 72 are not bonded together. In other embodiments, each attachment member 50 is a single integral component as shown in FIGS. 8 and 9.

The first segment 70 is formed to include an inner region 78 as shown in FIG. 4. The second segment 72 is formed to include an inner region 80. The inner regions 78, 80 of the first segment 70 and the second segment 72 cooperate to define the blade-receiver cavity 58. The first segment 70 includes the first retainer arm 54 and a lug 82 that forms a portion of the attachment root 52. The second segment 72 includes the second retainer arm 56 and a lug 84 that forms a portion of the attachment root 52. The bond layer 74 is located between the lug 82 and the lug 84 to block relative movement between the first segment 70 and the second segment 72.

Forming each attachment member 50 out of more than one segment 70, 72 allows the first segment 70 and the second segment 72 to apply a compression load to the blade 26 received in the blade-receiver cavity 58. For example, a method of assembling the turbine wheel assembly 20 may include providing one of the blades 26 and one of the attachment members 50 and locating the root 40 of the blade 26 in the first inner region 78 of the first segment 70 of the attachment member 50 and the second inner region 80 of the second segment 72 of the attachment member 50. The method includes compressing the root 40 of the blade 26 with the first segment 70 and the second segment 72 and blocking relative movement between the first retainer arm 54 of the first segment 70 and the second retainer arm 56 of the second segment 72 after the compressing step so that the first retainer arm 54 and the second retainer arm 56 form the attachment root 52 adapted to mate with the disk 24 of the gas turbine engine 10. The method may include bonding the first retainer arm 54 to the second retainer arm 56 to block relative movement between the first segment 70 and the second segment 72. The root 40 of the blade 26 may be bonded with the attachment member 50.

The blade-attachment system 28 couples the plurality of ceramic matrix composite blades 26 to the disk 24 for rotation with the disk 24 about the center axis 11 as suggested in FIG. 2. The plurality of blades 26 comprise ceramic matrix composite materials in the illustrative embodiment and have roots 40 that may be larger than the roots of typical metallic blades. Designing a disk adapted to directly retain the relatively larger roots 40 of the ceramic matrix composite blades 26 may present challenges. As one example, the width of blade slots in a typical disk may need to be enlarged for the larger roots 40 of ceramic matrix composite blades 26 which may cause the disk posts to be relatively thin.

The blade-attachment system 28 allows the lighter ceramic matrix composite blades 26 having larger roots 40 to couple with the disk 24 while maintaining a desired slot width in the disk 24. As a result, the turbine wheel assembly 20 may include the same number of ceramic matrix composite blades 26 as a comparable wheel assembly having metallic blades. In some embodiments, the blade-attachment system 28 allows for blade root geometry that may be favorable to ceramic matrix composite structural limits.

Figure 7:
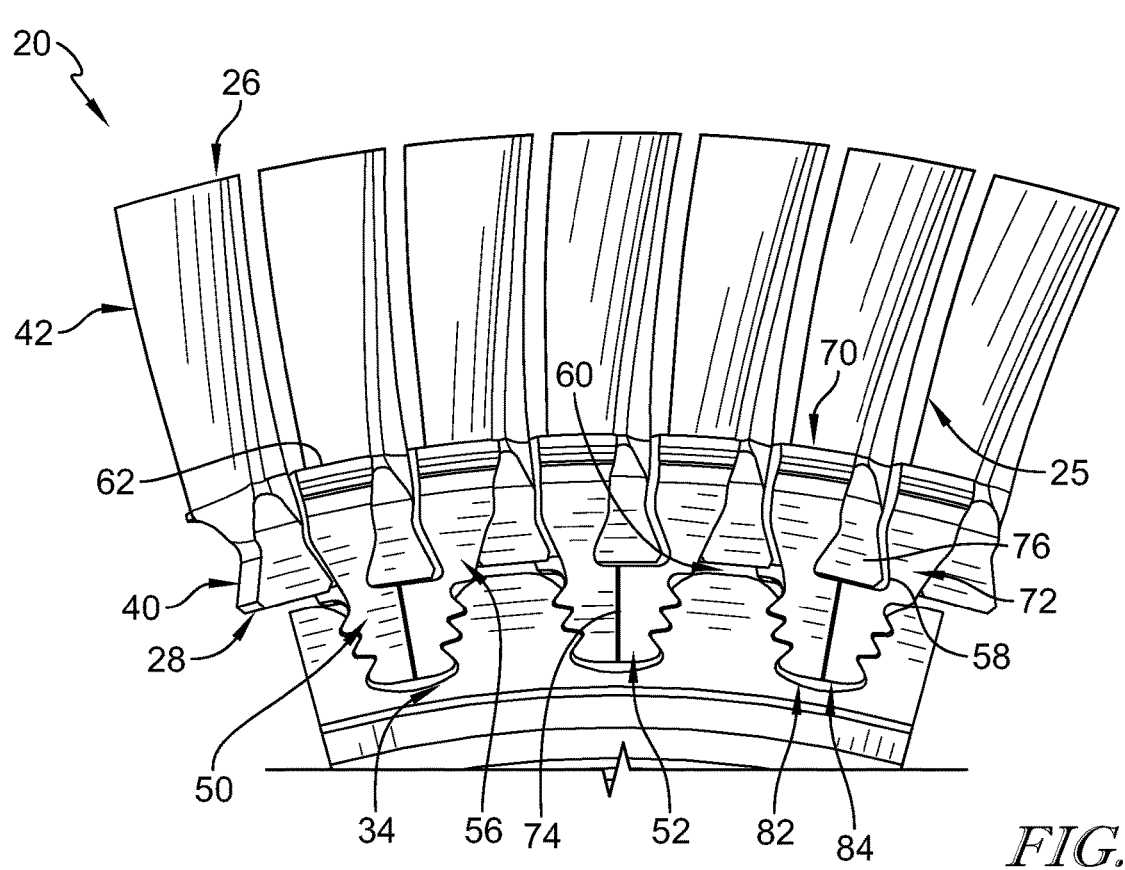
FIG. 7 is front elevation view of another embodiment of a turbine wheel assembly adapted for use in the gas turbine engine of FIG. 1 showing that the attachment members tapper inwardly and include open faces to allow the blades to slide axially into the blade-receiver cavities.

Another embodiment of the turbine wheel assembly 20 in accordance with the present disclosure is shown in FIG. 7. The turbine wheel assembly 20 shown in FIG. 7 is similar to the turbine wheel assembly shown in FIGS. 2-6. However, the blade-receiver cavity 58 extends axially through the forward wall 64 and the aft wall 66 to allow the blades 26 to slide axially into the blade-receiver cavity 58. The turbine wheel assembly 20 of FIG. 7 does not include a bond layer 74 between segments 70, 72.

Combustor outlet temperatures may be designed to be ever higher to improve cycle efficiency and power density in an attempt to improve turbine efficiency. Incorporation of ceramic matrix composite components and other composite components into the turbine section may reduce cooling air needs in the turbine due to their higher temperature capability and may reduce engine weight due to their relatively low density when compared to typical metallic blades.

According to the present disclosure, a turbine blade wheel stage 20 may include blades 26 attached to the disk 24 via an intermediate attachment component 50. As a result, the number of attachment components 50 is roughly half of the number of blades 26 in the illustrative embodiment. Each attachment component 50 helps to radially retain three or more blades 26. The attachment component 50 may be attached to the disk 24 through typical methods such as a fir tree or dovetail as shown in FIG. 6.

This attachment members 50 may be used with ceramic matrix composite blades 26 due to the reduced weight of the blades 26 when compared to a high temperature nickel alloy component. The centrifugal force acting on the ceramic matrix composite blades 26 may be reduced by about two-thirds theoretically as compared to typical metallic blades. The strength of ceramic matrix composite may be lower than metal which may not allow for a ceramic matrix composite blade made from the same geometry as the metal geometry. The ceramic matrix composite blade may have some regions where an increase in thickness is desired like the minimum area above the attachment as shown in FIG. 5. The disk 24 and attachment members 50 may be used with ceramic matrix composite blades, composite blades, or any other relatively light blade when compared to typical metal blades.

One embodiment, shown in FIG. 8, uses a ceramic matrix composite blades 26 with dovetail attachment feature (sometimes called a root 40). The number of blades 26 may be double the number of attachment components 50. Each of the attachment components 50 are coupled to the disk 24 with a fir-tree attachment. This design allows for a single blade design to fit in either position of the attachment component 50 (centered or side loaded). However, a different shaped blade may go in each position in other embodiments as suggested in FIG. 10. For example, blades of a first size may be received in the cavities 58 and blades of another size may be received in the passages 60. One advantage of this design may be that it allows the same number of blades with a larger ceramic matrix composite attachment 40 to fit in the same disk 24 as a metallic design blade with one disk attachment feature per blade.

The attachment component 50 may need to carry the load of two blades 26 (one blade load on center and half a blade load on each side). The centrifugal load of the ceramic matrix composite blades 26 may be half of that of a metal blade. Thus, the fir tree in the disk 24, by retaining two blades 26, may carry an equivalent load of one typical metal blade. The width of the disk posts 32 and the attachment root 52 can be optimized for to support the design loads as suggested in FIGS. 8, 9, and 10. For example, the attachment roots 52 of the attachment members 50 in FIG. 8 taper and are narrow at the radial inner ends while the disk posts 32 are wide. The attachment roots 52 of the attachment members 50 in FIG. 9 are wide at the radial inner ends while the disk posts 32 are relatively narrow.

In another embodiment, the attachment component 50 is shown as being a bonded inseparable assembly with half of the blades 26 as shown in FIG. 10. The other half of the blades 26 are supported on the sides of the attachment components 50. With this concept, additional space claim in the disk 24 may be achieved by using a lower flank angle (alpha) in the ceramic matrix composite blades 26. The lower flank angle is enabled by pre-compressing the ceramic matrix composite blade 26 in the bonded metal attachment component 50. A platform feature can be incorporated into the metallic attachment components 50.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A wheel assembly for a gas turbine engine, the wheel assembly comprising
a metallic disk that includes a body arranged around an axis and a plurality of disk posts that extend radially away from the body to define an axially extending first disk slot and an axially extending second disk slot spaced apart circumferentially relative to the first disk slot,
a plurality of ceramic matrix composite blades adapted to interact with gases during use of the gas turbine engine and each of the plurality of ceramic matrix composite blades having substantially similar radial lengths, and
a blade-attachment system that couples the plurality of ceramic matrix composite blades to the disk for rotation with the disk, the blade-attachment system includes a first attachment member received in the first disk slot to couple the first attachment member to the disk and a second attachment member received in the second disk slot to couple the second attachment member to the disk,
wherein the plurality of ceramic matrix composite blades includes a first blade, a second blade, and a third blade, each of the first blade, the second blade, and the third blade includes a root and an airfoil that extends radially away from the root, the root of the first blade is received in the first attachment member to couple the first blade to the first attachment member, the root of the second blade is received in the second attachment member to couple the second blade to the second attachment member, and the root of the third blade is received between the first attachment member and the second attachment member to couple the third blade to the blade-attachment system, and
wherein the radial length of each of the plurality of ceramic matrix composite blades is measured from a bottom of the root to a tip of the airfoil.

2. The wheel assembly of claim 1, wherein the first attachment member includes a first segment and a second segment that cooperate to define a blade-receiver cavity in which the first blade is received and the first attachment member includes a first bond layer located between the first segment and the second segment to couple the first segment to the second segment such that the first segment and the second segment apply a compression load to the first blade.

3. The wheel assembly of claim 2, wherein the first attachment member includes an isolation layer located between the root of the first blade and the first attachment member to resist chemical interaction between the first attachment member and the first blade.

4. The wheel assembly of claim 3, wherein the root of the third blade is not bonded to the first attachment member and the second attachment member.

5. The wheel assembly of claim 2, wherein the root of the first blade has a first planar side and a second planar side spaced apart circumferentially from the first planar side, the first planar side and the second planar side define an angle alpha therebetween, and the angle alpha is between about 10 degrees and about 60 degrees.

6. The wheel assembly of claim 1, wherein the first attachment member includes a forward wall and an aft wall spaced apart axially from the forward wall, the forward wall and the aft wall define a portion of a blade-receiver cavity formed in the first attachment member, the first blade is received in the blade-receiver cavity, and the forward wall and the aft wall block the first blade from moving axially out of the blade-receiver cavity.

7. The wheel assembly of claim 6, wherein the forward wall and the aft wall of the first attachment member extend circumferentially toward the second attachment member and block axial movement of the third blade relative to the first attachment member.

8. The wheel assembly of claim 1, wherein the first attachment member extends around the first blade and at least a portion of the third blade to form a portion of a primary gas path such that the first attachment member is exposed to the gases and resists radially inward movement of the gases toward the disk during operation of the gas turbine engine.

9. A wheel assembly for a gas turbine engine, the wheel assembly comprising
a disk formed to define a first disk slot and a second disk slot spaced apart circumferentially from the first disk slot,
a blade-attachment system that includes a first attachment member received in the first disk slot and a second attachment member received in the second disk slot,
a plurality of blades that includes a first blade received in the first attachment member, a second blade received in the second attachment member, and a third blade located between the first attachment member and the second attachment member with the first attachment member and the second attachment member shaped such that the first attachment member and the second attachment member block radial outward movement of the first blade, the second blade, and the third blade,
wherein the first attachment member and the second attachment member form a portion of a primary gas path of the gas turbine engine such that the first attachment member and the second attachment member are exposed to gases and resist radially inward movement of the gases toward the disk during operation of the gas turbine engine, and
wherein each of the first blade, the second blade, and the third blade includes a root and an airfoil that extends radially away from the root, and wherein each of the plurality of the blades have a substantially similar radial length as measured from bottom of the root to a tip of the airfoil.

10. The wheel assembly of claim 9, wherein the first attachment member includes a first segment and a second segment that cooperate to define a blade-receiver cavity in which the first blade is received.

11. The wheel assembly of claim 10, wherein the first attachment member further includes a bond layer located between the first segment and the second segment.

12. The wheel assembly of claim 10, wherein the first segment is formed to block the first blade from moving axially out of the blade-receiver cavity.

13. The wheel assembly of claim 9, the root of the first blade has a first planar side and a second planar side that cooperate to define an angle alpha between the first planar side and the second planar side, and the angle alpha is between about 10 degrees and about 60 degrees.

14. The wheel assembly of claim 9, wherein the radial length of the first blade is the same as the radial length of the third blade.

15. The wheel assembly of claim 9, wherein the first blade is chemically isolated from metallic materials making up most of the first attachment member.

16. The wheel assembly of claim 9, wherein the first attachment member and the second attachment member each include a first segment, a second segment that cooperates with the first segment to define a blade-receiver cavity therebetween, and platforms that extend axially and circumferentially away from one of the first segment and second segment of each of the first attachment member and the second attachment member around the plurality of blades to form the portion of a primary gas path of the gas turbine engine.

17. A method comprising
providing a first blade and a first attachment member, the first blade includes a root and an airfoil that extends away from the root, and the first attachment member includes a first segment having a first lug and a first retainer arm that cooperate to define a first inner region and a second segment having a second lug and a second retainer arm that cooperate to define a second inner region,
locating the root of the first blade in the first inner region and the second inner region of the first attachment member,
compressing the root of the first blade with the first segment and the second segment of the first attachment member,
coupling the first segment of the first attachment member to the second segment of the first attachment member to block relative movement between the first lug and the second lug of the first attachment member after the compressing step so that the first lug and the second lug of the first attachment member form a first attachment root adapted to mate with a disk of a gas turbine engine,
providing a second blade, a third blade, and a second attachment member, the second blade and the third blade each include a root and an airfoil that extends away from the root, and the second attachment member includes a first segment having a first lug and a first retainer arm that cooperate to define a first inner region and a second segment having a second lug and a second retainer arm that cooperate to define a second inner region,
locating the root of the second blade in the first inner region and the second inner region of the second attachment member,
compressing the root of the second blade with the first segment and the second segment of the second attachment member,
coupling the first segment of the second attachment member to the second segment of the second attachment member to block relative movement between the first lug and the second lug of the second attachment member after the compressing step so that the first lug and the second lug of the second attachment member form a second attachment root adapted to mate with the disk of the gas turbine engine, and
locating the root of the third blade between the first attachment member and the second attachment member so that the third blade is adapted to be coupled with the disk of the gas turbine engine,
wherein the first blade, the second blade, and the third blade have similar radial lengths that are measured from a bottom of the root to a tip of the airfoil of each blade.

18. The method of claim 17, further comprising bonding the first lug to the second lug for each of the first attachment member and the second attachment member to block relative movement between the first segment and the second segment of each of the first attachment member and the second attachment member.

19. The method of claim 17, wherein the root of each of the first blade, the second blade, and the third blade has a first planar side and a second planar side that cooperate to define an angle alpha between the first planar side and the second planar side and the angle alpha is between about 10 degrees and about 60 degrees.

* * * * *